United States Patent
Hsu et al.

(10) Patent No.: US 8,191,023 B2
(45) Date of Patent: May 29, 2012

(54) SYSTEM AND METHOD FOR SELECTING HIGH SPEED SERIAL SIGNALS

(75) Inventors: Shou-Kuo Hsu, Taipei Hsien (TW); Cheng-Hsien Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 275 days.

(21) Appl. No.: 12/606,120

(22) Filed: Oct. 26, 2009

(65) Prior Publication Data

US 2011/0066764 A1    Mar. 17, 2011

(30) Foreign Application Priority Data

Sep. 16, 2009    (CN) .......................... 2009 1 0307089

(51) Int. Cl.
*G06F 17/50* (2006.01)
(52) U.S. Cl. ............ 716/110; 716/101; 716/55; 716/51; 710/14
(58) Field of Classification Search ............. 716/51, 716/55, 101, 110; 710/14
See application file for complete search history.

(56) References Cited

U.S. PATENT DOCUMENTS

| 2009/0009438 A1* | 1/2009 | Kanai et al. | 345/75.2 |
| 2009/0300568 A1* | 12/2009 | Kuroda | 716/10 |

* cited by examiner

*Primary Examiner* — Nghia Doan
*Assistant Examiner* — Brian Ngo
(74) *Attorney, Agent, or Firm* — Altis Law Group, Inc.

(57) ABSTRACT

A system for selecting high speed serial signals includes a loading module, a layout selecting module, a data processing module, and an output module. The loading module reads a chip package length file; a layout selecting module reads a layout file and selects high speed serial signals preset by a user; the data processing module selects pins information of a start chip and a terminal chip transmit the selected high speed serial signals and finds the chip package length information, and analyzes interrupt points of the layout character from the start chip and outputs the chip package length information of the start chip, the layout length information, and the chip package length information of the terminal chip in sequence to the output module, to convert into a table and displays the table via a display device.

3 Claims, 3 Drawing Sheets

| Net name | Tx_Pkg | Len1 | Len2 | Len3 | Len4 | Len5 | Rx_Pkg |
|---|---|---|---|---|---|---|---|
| ("CSI_IOH_CPU1_00_DP" | 0.375 | 0.02828428 | 0.6307915 | 11.8649 | 0.528256 | 0.02828427 | 0.41391) |
| ("CSI_IOH_CPU1_01_DP" | 0.449 | 0.02828427 | 0.8431416 | 11.70268 | 0.4328475 | 0.02828427 | 0.60542) |
| ("CSI_IOH_CPU1_02_DP" | 0.527 | 0.02828427 | 0.5963513 | 11.95021 | 0.4096726 | 0.02828427 | 0.59074) |
| ("CSI_IOH_CPU1_03_DP" | 0.567 | 0.02828427 | 0.3606557 | 12.22588 | 0.3542768 | 0.02828427 | 0.66977) |
| ("CSI_IOH_CPU1_04_DP" | 0.687 | 0.02828427 | 0.1756035 | 12.54851 | 0.2554146 | 0.02828427 | 0.64126) |
| ("CSI_IOH_CPU1_05_DP" | 0.626 | 0.02828427 | 0.3342163 | 12.559 | 0.126071514 | 0.02828427 | 0.76021) |
| ("CSI_IOH_CPU1_06_DP" | 0.404 | 0.02828427 | 0.3061281 | 12.65732 | 0.02828427 | 0.77899) | |
| ("CSI_IOH_CPU1_07_DP" | 0.645 | 0.02828427 | 0.1559195 | 12.80746 | 0.07689229 | 0.02828427 | 0.74005) |
| ("CSI_IOH_CPU1_08_DP" | 0.673 | 0.02828427 | 0.1922423 | 12.57756 | 0.1806179 | 0.02828427 | 0.61584) |
| ("CSI_IOH_CPU1_09_DP" | 0.603 | 0.02828428 | 0.2398107 | 12.64158 | 0.071573802 | 0.02828427 | 0.70454) |
| ("CSI_IOH_CPU1_10_DP" | 0.647 | 0.02828427 | 0.2860886 | 12.62876 | 0.1193039 | 0.02828427 | 0.72581) |
| ("CSI_IOH_CPU1_11_DP" | 0.713 | 0.02828427 | 0.1612334 | 12.59316 | 0.2030474 | 0.02828427 | 0.70986) |
| ("CSI_IOH_CPU1_12_DP" | 0.686 | 0.02828428 | 0.2040432 | 12.80856 | 0.1713382 | 0.02828427 | 0.7274) |
| ("CSI_IOH_CPU1_13_DP" | 0.683 | 0.02828427 | 0.4199421 | 12.20347 | 0.4094949 | 0.02828427 | 0.60043) |
| ("CSI_IOH_CPU1_14_DP" | 0.605 | 0.02828428 | 0.4592333 | 12.3799 | 0.2540143 | 0.02828427 | 0.78561) |
| ("CSI_IOH_CPU1_15_DP" | 0.596 | 0.02828427 | 0.4367457 | 12.29015 | 0.3111324 | 0.02828427 | 0.86198) |
| ("CSI_IOH_CPU1_16_DP" | 0.383 | 0.02828427 | 0.5965683 | 11.94148 | 0.5235602 | 0.02828427 | 0.68972) |
| ("CSI_IOH_CPU1_17_DP" | 0.381 | 0.02828427 | 0.7404852 | 12.16027 | 0.1915797 | 0.02828427 | 0.74190) |

FIG. 3

SYSTEM AND METHOD FOR SELECTING HIGH SPEED SERIAL SIGNALS

BACKGROUND

1. Technical Field

The present disclosure relates to selecting systems and selecting methods, and particularly to a system for selecting high speed serial signals and a method for the same.

2. Description of Related Art

High speed serial signals are widely used in electronic devices such as computers. Transmission speed of the high speed serial signals can be 10 gigabits per second (Gbps). Equalizers are needed to compensate for the loss of transmission path and reduce signal reflection caused by impedance discontinuity. However, due to restrictions on chip design, the provided equalizer parameters are limited. For example, a group of quick path interconnect (QPI) interfaces include 40 pairs of differential signals, and the chip can only provide a pair of equalizer parameters corresponding to the group of QPI interfaces. In order to get the best of the equalizer parameters, the 40 pairs of differential signals of the group of QPI interfaces must be selected for simulating signal integrality. The differential signals are generally selected by manual operation, which will be time-consuming and error-prong.

BRIEF DESCRIPTION OF THE DRAWINGS

FIG. 3 is an sample table output by the system of FIG. 1.

DETAILED DESCRIPTION

Figure 1:
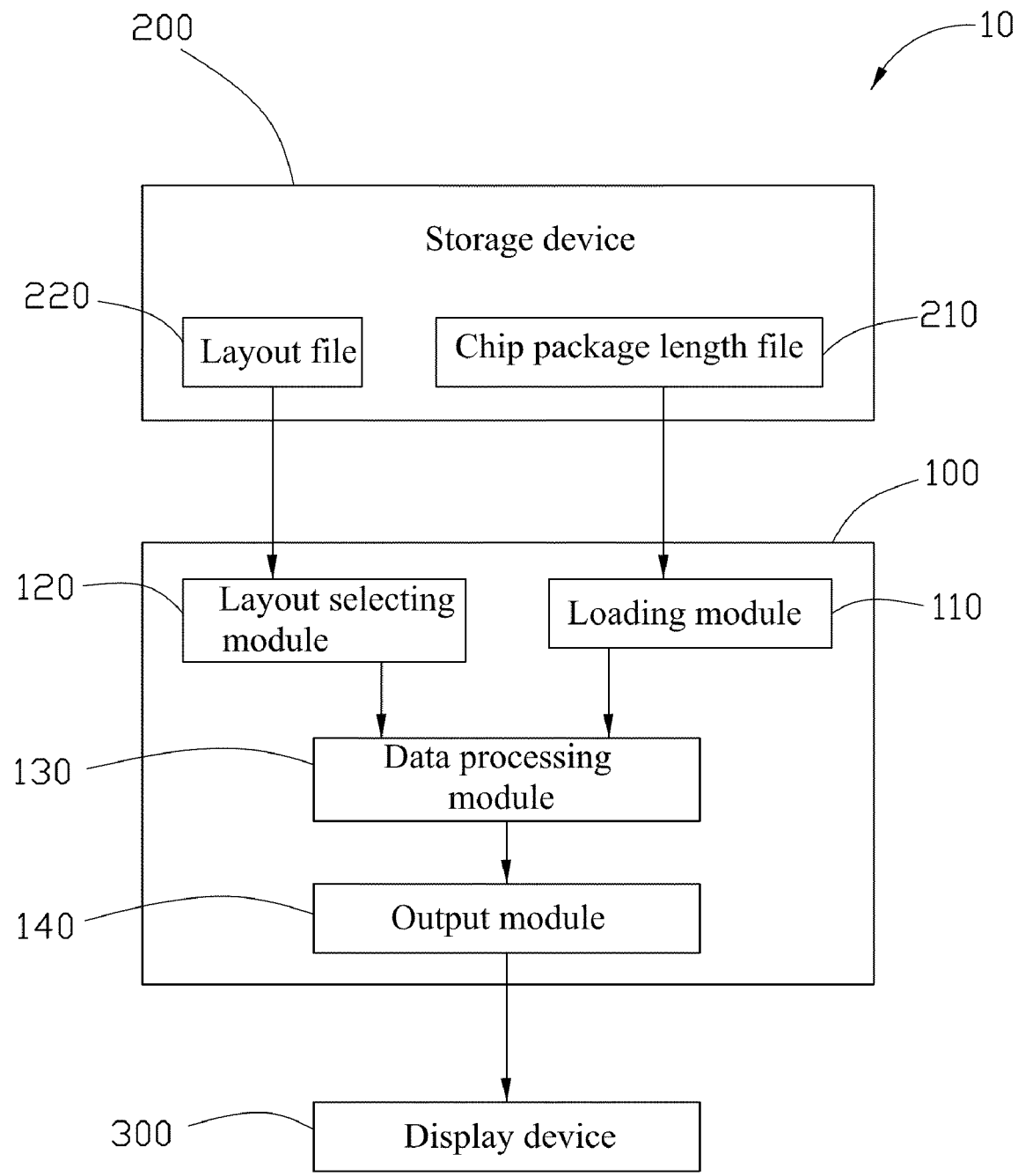
FIG. 1 is a block diagram of an embodiment of a system for selecting high speed serial signals.

Referring to FIG. 1, a system 100 is applied to a computer 10, to select high speed serial signals of the computer 10 for simulating the signal integrality of the high speed serial signals. The computer 10 includes a storage device 200, such as a hard disk drive, and a display device 300. The storage device 200 stores a chip package length file 210 and a layout file 220. The chip package length file 210 includes package length information of each chip of the computer 10. The layout file 220 includes high speed serial signal information preset by a user of the computer 10. The display device 300 displays results output by the system 100.

An exemplary embodiment of the system 100 includes a loading module 110, a layout selecting module 120, a data processing module 130, and an output module 140.

The loading module 110 reads the chip package length file 210 from the storage device 200 and sends the data of the chip package length file 210 to the data processing module 130. The layout selecting module 120 reads the layout file 220 from the storage device 200 and sends the data of the layout file 220 to the data processing module 130, and selects a high speed serial signal preset by the user according to the layout file 220. The data processing module 130 selects pin information of a start chip and a terminal chip transmits the selected high speed serial signal. The data processing module 130 finds the chip package length information from the chip package length file 210 corresponding to the pin information. The data processing module 130 analyses interrupt points of the layout character from the start chip and outputs the chip package length information of the start chip, the layout length information, and the chip package length information of the terminal chip in sequence to the output module 140. The interrupt point of the layout character corresponds to different widths of layout or different surfaces of layout. If the surfaces of layout are different, the layout length between all interrupt points is equal to a sum of each of the layout length of each interrupt point. The output module 140 converts the chip package length information of the start chip, the layout length information, and the chip package length information of the terminal chip into a table and displays the table via the display device 300. For example, referring to FIG. 3, the "Net name" represents a name of a quick path interconnect, such as central processing unit (CPU) connects to north bridge chip. The "Tx_Pkg" represents the package length information of the start chip. The "Len1"-"Len5" respectively represent different layout lengths information. The "Rx_Pkg" represents the package length information of the terminal chip.

Figure 2:
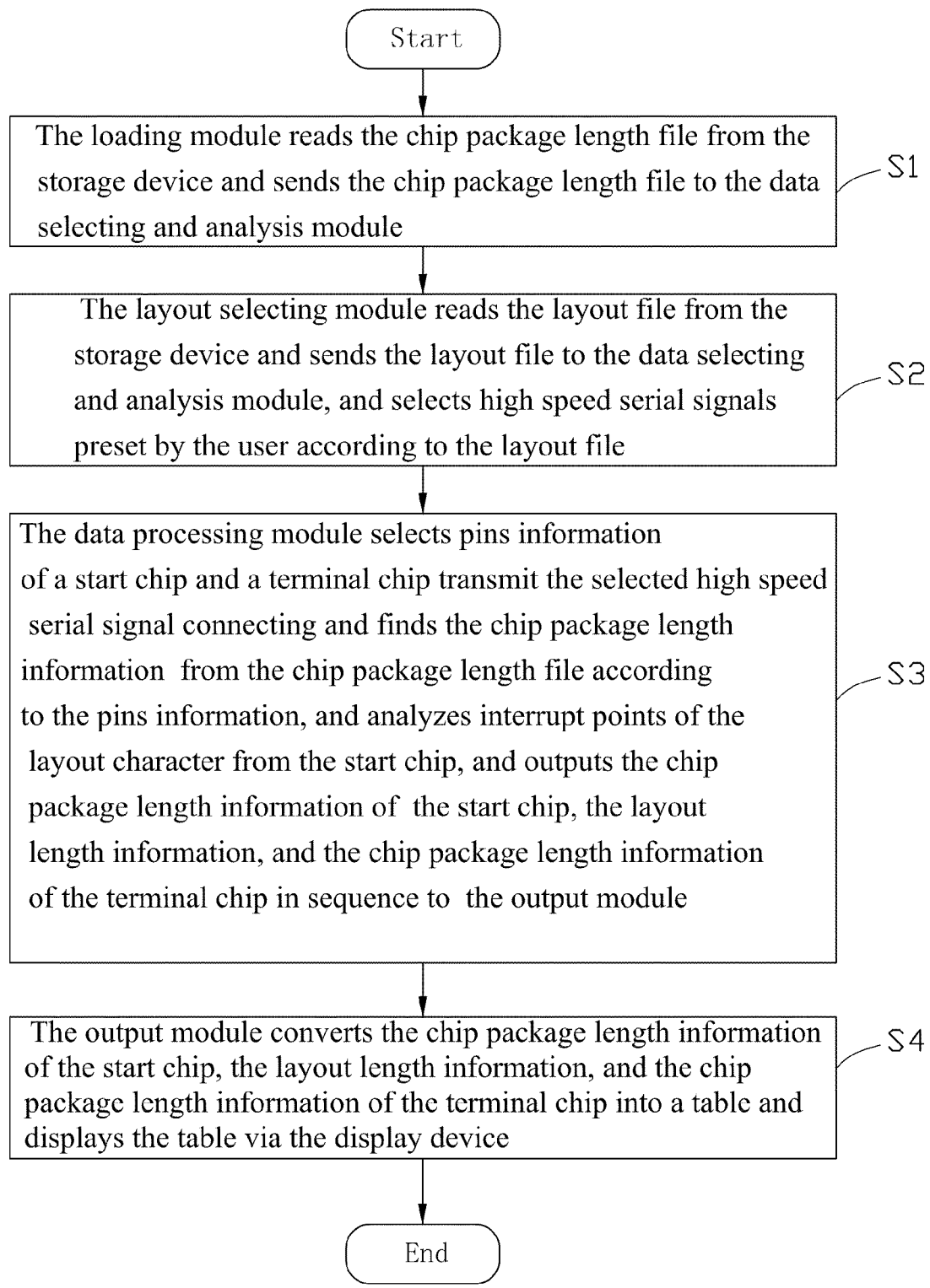
FIG. 2 is a flowchart of an embodiment of a method for selecting high speed serial signals.

Referring to FIG. 2, an exemplary embodiment of a method for selecting high speed serial signals includes the following steps.

In step S1, the loading module 110 reads the data of the chip package length file 210 from the storage device 200 and sends the chip package length file 210 to the data processing module 130.

In step S2, the layout selecting module 120 reads the data of the layout file 220 from the storage device 200 and sends the layout file 220 to the data processing module 130, and selects high speed serial signals preset by the user according to the layout file 220.

In step S3, the data processing module 130 selects pin information of a start chip and a terminal chip transmit the selected high speed serial signals, the data processing module finds the chip package length information from the chip package length file 210 according to the pin information, the data processing module analyzes interrupt points of the layout character from the start chip and outputs the chip package length information of the start chip, the layout length information, and the chip package length information of the terminal chip in sequence to the output module 140.

In step S4, the output module 140 converts the chip package length information of the start chip, the layout length information, and the chip package length information of the terminal chip into a table and displays the table via the display device 300.

The system 100 and method for selecting high speed serial signals can quickly and exactly select the high speed serial signals and output the selected high speed serial signals in the form of a table. Therefore, the system and method for selecting high speed serial signals saves simulation time and reduces mistakes caused by manual operation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for selecting high speed serial signals applied to a computer, the computer comprising a storage device and a display device, the storage device to store a chip package length file comprising package length information of each of chips and a layout file comprising high speed serial signals preset by a user of the computer, the system for selecting high speed serial signals comprising:
- a loading module to read the chip package length file from the storage device and output the data of the chip package length file;
- a layout selecting module to read the layout file from the storage device and output the data of the layout file, and select high speed serial signal preset by the user according to the layout file;
- a data processing module to receive the data of the chip package length file from the loading module and the data of the layout file from the layout selecting module, and select pin information of a start chip and a terminal chip and transmit the selected high speed serial signal, the data processing module to find the chip package length information from the chip package length file according to the pin information, the data processing module to analyze interrupt points of the layout character from the start chip and output the chip package length information of the start chip, the layout length information, and the chip package length information of the terminal chip in sequence; and
- an output module to receive the chip package length information of the start chip, the layout length information, and the chip package length information of the terminal chip from the data processing module and convert the chip package length information of the start chip, the layout length information, and the chip package length information of the terminal chip into a table and display the table via the display device.

2. The system of claim 1, wherein the storage device is a hard disk drive.

3. A method for selecting high speed serial signals by a computer, the computer comprising a storage device and a display device, the storage device to store a chip package length file comprising package length information of each of chips of the computer and a layout file comprising high speed serial signals preset by a user of the computer, the method for selecting high speed serial signals comprising:
- a: reading a chip package length file from the storage device and sending the data of the chip package length file to a data processing module;
- b: reading a layout file from the storage device and sending the data of the layout file to the data processing module, and selecting high speed serial signals preset by the user according to the layout file;
- c: selecting pin information of a start chip and a terminal chip and transmitting the selected high speed serial signal and finding the chip package length information according to the pin information, analyzing interrupt points of the layout character from the start chip and outputting the chip package length information of the start chip, the layout length information, and the chip package length information of the terminal chip in sequence to an output module; and
- d: converting the chip package length information of the start chip, the layout length information, and the chip package length information of the terminal chip into a table and displaying the table via the display device.

* * * * *